United States Patent
Ayon et al.

(10) Patent No.: US 9,829,396 B2
(45) Date of Patent: Nov. 28, 2017

(54) SURFACE-MOUNTED MONITORING SYSTEM

(75) Inventors: Arturo Ayon, San Antonio, TX (US); Cory Hallam, San Antonio, TX (US)

(73) Assignee: BOARD OF REGENTS OF THE UNIVERSITY OF TEXAS SYSTEM, Austin, TX (US)

( * ) Notice: Subject to any disclaimer, the term of this patent is extended or adjusted under 35 U.S.C. 154(b) by 903 days.

(21) Appl. No.: 13/642,785

(22) PCT Filed: Apr. 22, 2011

(86) PCT No.: PCT/US2011/033678
§ 371 (c)(1),
(2), (4) Date: Dec. 13, 2012

(87) PCT Pub. No.: WO2011/133942
PCT Pub. Date: Oct. 27, 2011

(65) Prior Publication Data
US 2013/0197825 A1    Aug. 1, 2013

Related U.S. Application Data

(60) Provisional application No. 61/327,013, filed on Apr. 22, 2010.

(51) Int. Cl.
*G01L 1/00* (2006.01)
*G01M 5/00* (2006.01)

(52) U.S. Cl.
CPC ........... *G01L 1/005* (2013.01); *G01M 5/0025* (2013.01); *G01M 5/0041* (2013.01)

(58) Field of Classification Search
CPC ........... G01L 1/00; E04B 7/00; E04D 13/006; G08B 23/00; G01M 5/0041
See application file for complete search history.

(56) References Cited

U.S. PATENT DOCUMENTS

| 5,850,185 A | 12/1998 | Canty |
| 6,832,528 B2 | 12/2004 | Selig et al. |

(Continued)

FOREIGN PATENT DOCUMENTS

| DE | 102006007857 | 8/2007 |
| DE | 102006014813 | 9/2007 |

(Continued)

OTHER PUBLICATIONS

Strasse, U., "Snow loads in a changing climate: new risks?", Jan. 9, 2008, Natural Hazards and Earth System Sciences, 8, pp. 1-8.*

(Continued)

*Primary Examiner* — Mischita Henson
(74) *Attorney, Agent, or Firm* — Jackson Walker, LLP

(57) ABSTRACT

A surface mounted monitoring system is disclosed that is useful for detecting the presence of both ordinary and excessive loads on a surface, and for providing real-time or near real-time trending data. The system includes an array of force transducers disposed on the exterior surface of a structural member such as a roof. In an exemplary embodiment, transducers may be placed on an interior surface, such as embedded within insulation. The force transducers detect the magnitude of a load force acting on the surface. A data analysis module (DAM) may record force readings in a circular memory buffer, so that recent data can be recovered in the event of a catastrophic collapse. The DAM may also communicate with a monitoring device that can display real-time loading data to a user and perform other analysis.

16 Claims, 5 Drawing Sheets

(56) References Cited

U.S. PATENT DOCUMENTS

| | | | |
|---|---|---|---|
| 6,957,166 B1 | 10/2005 | Howie et al. | |
| 8,788,240 B2* | 7/2014 | Pioro | G01B 11/16 |
| | | | 702/150 |
| 2007/0164874 A1 | 7/2007 | Visser | |
| 2015/0259923 A1* | 9/2015 | Sleeman | E04D 11/02 |
| | | | 52/173.1 |

FOREIGN PATENT DOCUMENTS

| | | |
|---|---|---|
| DE | 102007023965 | 11/2008 |
| EP | 1806461 | 7/2007 |
| EP | 1840294 | 10/2007 |
| JP | S62-143220 | 9/1987 |
| JP | S63-97881 | 6/1988 |
| JP | 05195649 | 8/1993 |
| JP | H09-163529 | 12/1995 |
| JP | H10-108166 | 4/1998 |
| JP | 10238166 | 9/1998 |
| JP | P2008-82941 A | 4/2008 |
| WO | 2008006548 | 1/2008 |
| WO | 2009020399 | 2/2009 |

OTHER PUBLICATIONS

VanDevender, Karl and Petty, Doug, "Ice and Snow Accumulations on Roofs", Mar. 2006, University of Arkansa Division of Agriculture, pp. 1-2.*
Unknown, "Electrical Pressure Transducers", Sep. 21, 2011, Instrumentation-Electronics, pp. 1-7.*
Unknown, "Heavy-Duty voltage Output Pressure Transducer Standard and Metric Models", no date, pp. B-106-B-108.*
Japanese Office Action No. 014956 dated Jan. 20, 2015.
PCT international Search Report and Written Opinion, PCT/US2011/033678, dated Dec. 27, 2011.
Ice and Snow Accumuations on Roofs, University of Arkansas, Division of Agriculture, Mar. 21, 2006 (3 pages).
Roof Deflecction Monitoring, Safe Roof Systems, Inc., www.saferoofsystems.com at least before Apr. 22, 2010 (7 pages).

* cited by examiner

SURFACE-MOUNTED MONITORING SYSTEM

CROSS REFERENCE TO RELATED APPLICATIONS

This application claims priority to U.S. Provisional Application 61/327,013 entitled "Surface Mounted Monitoring System," filed Apr. 22, 2010, which is incorporated herein by reference.

U.S. Pat. No. 6,832,528 entitled "Load Cell" issued on Dec. 21, 2004 is incorporated herein by reference.

BACKGROUND

This specification relates to the field of structural engineering, and more particularly to a surface-mounted load monitoring system.

A structural member such as a roof may experience loads due to external forces acting on an exterior surface, such as snow or rain fall. Load accumulation may be indicative of other problems, such as ice damming or other accumulation. Sufficient load accumulation may cause the structure to catastrophically fail, thereby endangering occupants.

SUMMARY OF THE INVENTION

A surface mounted monitoring system is disclosed that is useful for detecting the presence of both ordinary and excessive loads on a surface, and for providing real-time or near real-time trending data. The system includes an array of force transducers disposed on the exterior surface of a structural member such as a roof. In an exemplary embodiment, transducers may be placed on an interior surface, such as embedded within insulation. The force transducers detect the magnitude of a load force acting on the surface. A data analysis module (DAM) may record force readings in a circular memory buffer, so that recent data can be recovered in the event of a catastrophic collapse. The DAM may also communicate with a monitoring device that can display real-time loading data to a user and perform other analysis.

DETAILED DESCRIPTION OF THE EMBODIMENTS

The specification relates to a surface mounted mass measurement system. A surface mounted mass measurement system of the present disclosure may include, for example, a surface mounted monitoring system for measuring structural roof loads. Force transducers, when subjected to changes in roof loading due to any cause, including wind, rain, snow, and others, produce a signal that is transmitted wirelessly or via wire to a device for analyzing and computing the load on the roof and calculating the ratio of current load to acceptable design load. The computing device may include a graphical user interface for setting acceptable load levels. The computing device can display the results locally on a monitor, store the result electronic file, or transmit the results for remote monitoring location for any form of electronic data communication, including phone lines, cable, internet, or wireless. The computed signal can trigger an alert and warning system if the loads are calculated to be above an acceptable value. When placed on or near drains, the load indicators can also be used to identify and alert drain clogging on roofs or structures.

A surface-mounted monitoring system will now be described with more particular reference to the attached drawings. Throughout this specification, certain: so the drawings may be referred to in a hyphenated form. In cases where hyphenation is used, the unhyphenated form will refer to the class of objects as a whole, while the hyphenated form will refer to individual species or examples of the object. For example, widgets as a whole may be referred to as "widgets 110," while an individual widget may be referred to as "widget 110-1."

The present disclosure discusses a surface mounted monitoring system in terms of an exemplary embodiment wherein the monitoring system is a rooftop monitoring system. But one having ordinary skill in the art will appreciate that the system of the present disclosure can be adapted to a plurality of other purposes.

Figure 1:
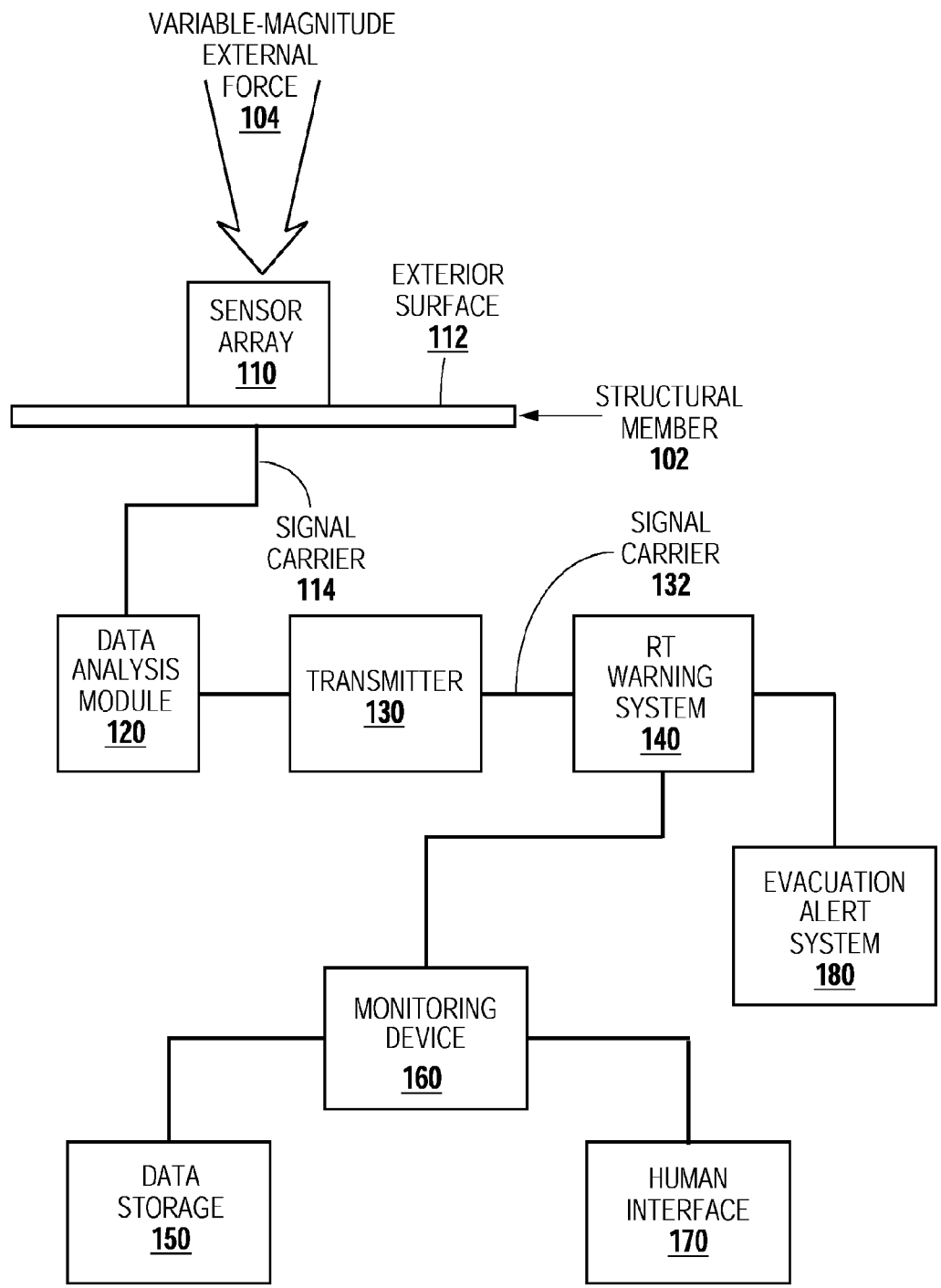
FIG. 1 is a block diagram of an exemplary embodiment of a surface mounted monitoring system.

FIG. 1 is a block diagram of an exemplary embodiment of a surface mounted monitoring system. Structural member 102, such as a roof or other similar structure includes an exterior surface 112. A variable-magnitude external force 104 acts on exterior surface 112, possibly causing stresses on structural member 102. Variable magnitude external force 104 may be the result of environmental factors. For example, wind, and accumulation of snow, water, or debris may result in loading on a roof. This loading can be represented as a plurality of input forces acting normal to the structural member 102.

If the magnitude of external force 104 becomes too large, roof 102 may lose integrity and collapse. A sensor array 110, which may include a plurality of force transducers arranged in a grid, is mounted on exterior surface 112. Sensor array 110 may be constructed of a variety of sensors known in the art. For example, piezoelectric, strain gauge, piezoresistive, pressure switch, or self resetting sensors may be used. In another exemplary embodiment, a load cell, such as that described in U.S. Pat. No. 6,832,528 may be used.

When the variable magnitude external force 104 acts upon the surface 112, the force is detected and transduced by sensor array 110. A signal carrier 114 communicatively couples sensor array 110 to a data analysis module (DAM) 120. Signal carrier 114 may be a physical conductor, or in some embodiments, sensor array 110 may include wireless sensors or radio frequency transmitters, in which case signal carrier 114 may be a wireless transmission medium. Data analysis module 120 is also communicatively coupled to transmission system 130, which may be any suitable wired or wireless transmission device. DAM 120 receives a plurality of force magnitude signals from sensor array 110. In some embodiments, each transducer of sensor array 110 provides a separate force magnitude signal. DAM 120 may be located at or near the structure to be monitored. In some embodiments, DAM 120 may poll sensor array 110 in near real-time, with each discrete force signal being received at an interval on the order of milliseconds. DAM 120 may be equipped with storage, and may continuously store signals received from sensor array 110. In some cases, the storage of DAM 120 may be able to accommodate only a relatively small storage medium, for example if DAM 120 is configured to be small and/or portable, or if the storage is a specialized or hardened storage medium. If the storage of DAM 120 is not sufficiently large to store continuous force magnitude signals indefinitely, the storage may be configured as a circular memory buffer. A circular memory buffer is arranged in a first-in-first-out scheme, so that the most recent data are always available. Equipping DAM 120 with a circular memory buffer may permit DAM 120 to perform a function similar to the so-called "black box" of aircraft, always holding recent data in the event of a catastrophe. To further enhance DAM 120's ability to provide useful information in the event of a catastrophe, DAM 120 may also be hardened against adverse environmental conditions. For example, the storage of DAM 120 may be hardened against events such as flood, impact, and fire. The storage may be similar to the crash survivable memory unit of a an aircraft black box, such as is disclosed in U.S. Pat. No. 4,644,494, which is incorporated by reference.

In some embodiments, DAM 120 may also be configured to analyze force magnitude inputs and provide different states, such as an alert state and an alarm state. For example, DAM 120 may have stored in its memory a first force input threshold and a second force input threshold for each transducer in sensor array 110. The threshold values may be selected for the specific structure by a qualified engineer or architect. The engineer or architect may also select or guide placement of the force transducers to ensure that structurally-important points are monitored.

The first thresholds may correspond to an ordinary loading event, wherein loading is higher than in the absence of any accumulation, but still within safe operating ranges. For example, in the event of normal to semi-heavy snowfall, structural member 102 may experience higher than average loading that is not indicative of an imminent catastrophic failure. In the event of this higher than average loading, it may be beneficial to begin permanently logging loading data outside of the circular memory buffer for the purpose of providing trending data. For example, the force magnitudes received from sensor array 110 may be transmitted to a separate monitoring device 160. Monitoring device 160 may be a desktop computer, workstation, or single-purpose computer. In some embodiments, monitoring device 160 may also be a portable device or smart phone with appropriate software. Monitoring device 160 may keep a permanent log of ordinary loading events. Thus, if a roof fails under lower than expected loading conditions, historical data can be reviewed to determine whether extensive exposure to ordinary, non-catastrophic loading might have contributed to the failure. Such trending data can also be used to better make end-of-lifecycle decisions for older structures.

In an exemplary embodiment, when DAM 120 detects that any force transducer of sensor array 110 has experienced an input force in excess of its first threshold, DAM 120 enters an alert state. In the alert state, DAM 120 may send an alert signal to monitoring device 160. Upon receiving the alert signal, monitoring device 160 may provide a visible non-emergency notification of the alert state to a human interface 170. Monitoring device 160 may also poll DAM 120 at regular intervals to receive updates of the force magnitudes. Monitoring device 160 may then store the received magnitudes in a permanent data storage 150. Users may also interact with monitoring device 160 via a human interface 170 to view or analyze historical data.

In the exemplary embodiment, DAM 210 also has stored therein a second threshold value for each force transducer of sensor array 110. Second thresholds are selected to correspond to excessive loading, such that structural member 102 may be in danger of imminent catastrophic failure.

The surface mounted monitoring system disclosed in the above paragraphs may be a modular design, and may include a fully integrated system, or a distributed network of sensors, transmitters and receivers, analyzers, monitors, and alert devices that can be fully scalable. The system may also be used with portable electronic devices for monitoring and alerting, including connectivity to the internet to serve any of the transmission roles. Monitoring device 160 may be embodied in a software-as-a-service web server or PDA-type device. The system may be powered directly from any source, including an electrical outlet, hard-wired power, solar power, battery power or wireless power.

A surface mounted monitoring system as disclosed above may be useful in a variety of applications, as will be appreciated by one having ordinary skill in the art. In one exemplary embodiment, a surface mounted monitoring system can be installed on a roof that may be subject to loads, such as from snowfall or rainfall. In an exemplary case, a heavy snowfall exerts an input force 104 upon the roof 112, which has mounted on the surface a sensor array 110. As the snowfall accumulates, the magnitude of input force 104 increases, and DAM 120 compares the magnitude of input force 104 with threshold values that have been programmed in accordance with normal loading events and excessive loading events.

The second threshold for each transducer is selected to represent a force magnitude that represents a danger of possible collapse or other failure. If DAM 120 detects a load on any transducer exceeding the second threshold, DAM 120 enters an alarm state. In the alarm state, DAM 120 sends an alarm signal to real-time warning system 140. The real-time warning system may provide additional analysis, such as refining the calculated probability of a failure based on present loading conditions. For example, real-time warning system 140 may determine that the structure is not in danger of imminent collapse because of the instantaneous loading, but the excessive loading is sufficient to possibly impair the integrity of the structure. This may mean that the building needs to be at least temporarily evacuated, until the roof can be sufficiently evaluated to ensure resident safety. Real-time warning system 140 may also determine that based on the excessive loading, collapse is or may be imminent. Real-time warning system 140 may then operate an evacuation alert system 180. Evacuation alert system 180 may provide visible and/or audible evacuation warnings, and may also provide other useful functions such as displaying preferred evacuation routes for residents of the building, or providing information such as preferred congregation spots.

Monitoring device 160 may also receive the alarm signal, and may also take additional action. For example, instead of polling DAM 120 for updated sensor readings on a regular basis, it may start to receive continuous data updates. Thus, in the event of a failure, sensor data surrounding the even may be available in the hardened storage of DAM 120 and in data storage 150 of user interface 160.

Figure 2:
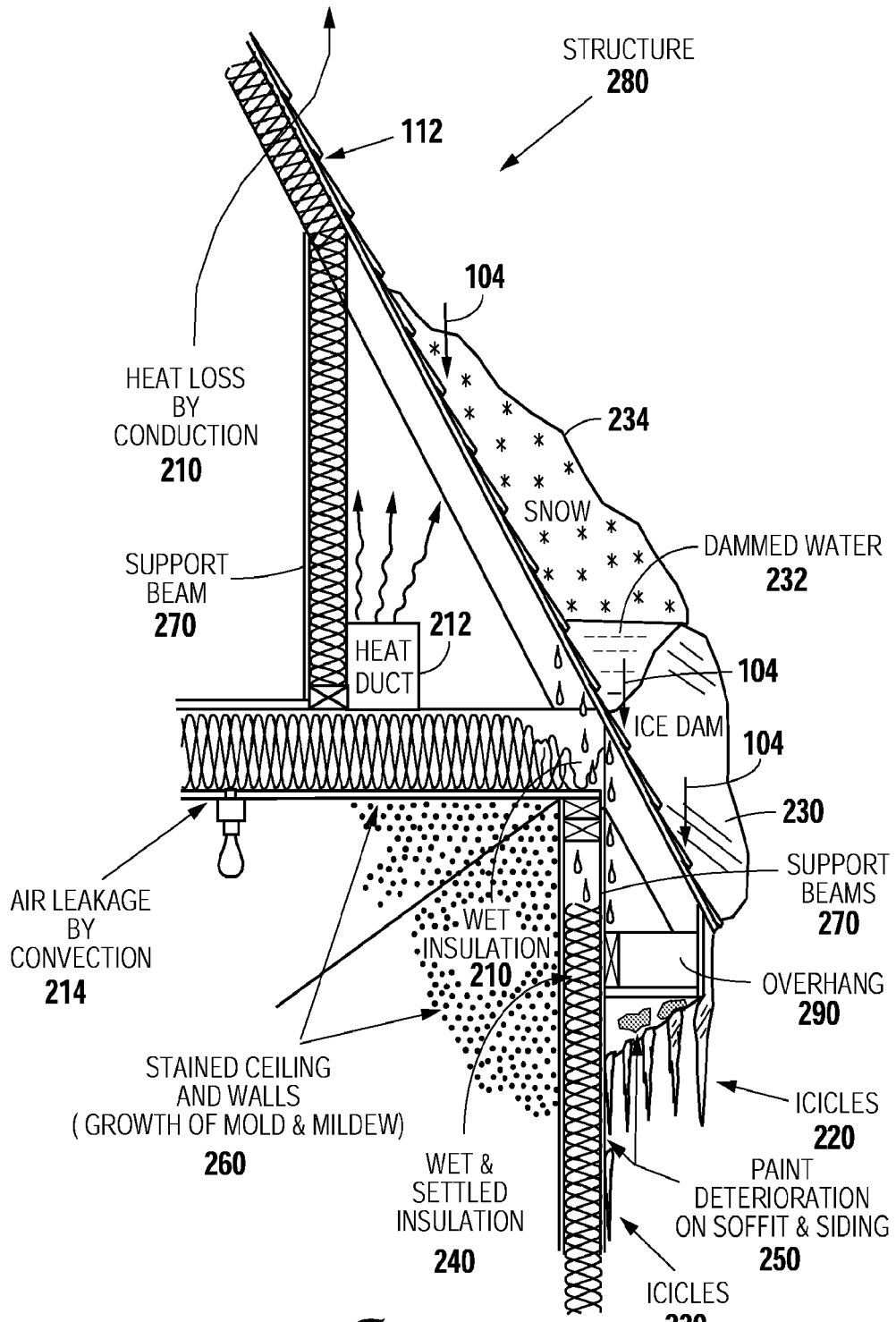
FIG. 2 is an illustration of a structure experiencing loading conditions.
Figure 3A:
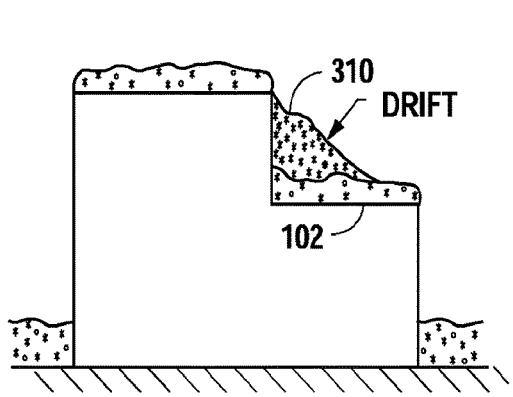
FIGS. 3A-3D are drawings of roof types that may be subject to excessive loading.
Figure 3B:
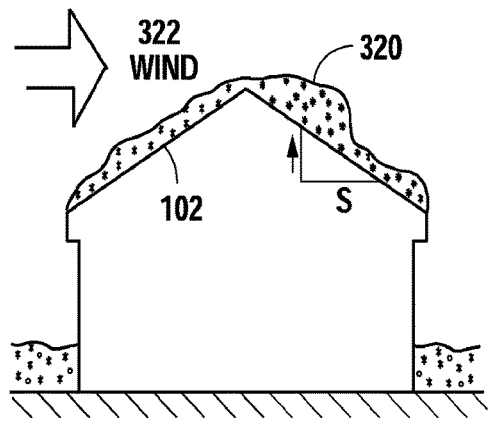
Figure 3C:
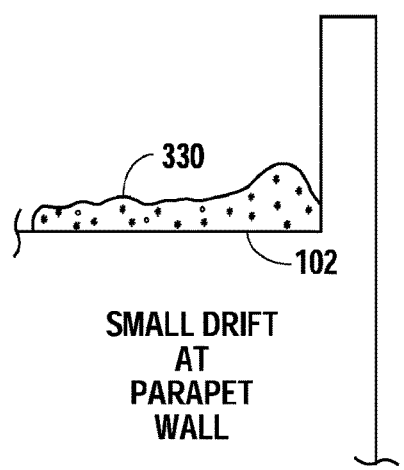
Figure 3D:
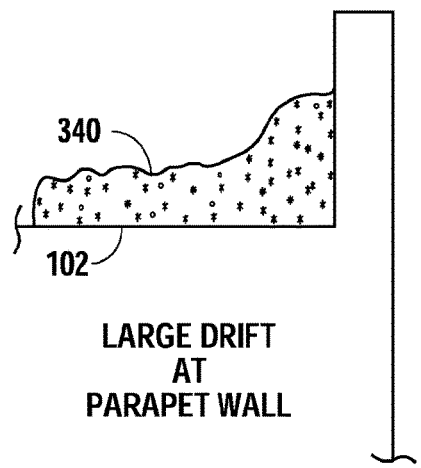

FIG. 2 discloses an exemplary structure illustrating the potential danger posed by accumulation and loading. In this example, structural member 102 is a roof of structure 280, which may be a house or other similar structure. Certain portions of roof 102 are directly supported by support beams 270. Support beams 270 may be walls, columns, or other structural support mechanisms. Other portions of the roof 102 fall between support beams 270 and are not supported directly. Portions of the structure that are not supported directly by support beams 270 are referred to as intermediate sections. The intermediate sections are at the most susceptible to structural failure. Special problems also arise in connection with support beams 270. For example, in this exemplary embodiment, snow 234 has accumulated on the roof 102. A heat duct 212 sits inside of structure 280. Heat duct 212 may cause heating of roof 102 by conduction 210. Snow 234 may melt, causing water to run down the exterior surface 112. After the water runs down the roof towards overhang 290, it begins to cool again once it is removed from heat loss 210. The water may refreeze, forming an ice dam 230. As additional snow 234 melts, water may pool above ice dam 230, forming a pool of accumulated dammed water 232. Thus, roof 102 may be subject to the combined input forces of snow 234, dammed water 232, and ice dam 230.

Furthermore, air leakage by convection 214 may also occur. Conduction 210 and convection 214 cause he exchanges, which contribute to the melting of snow 234.

Dammed water 232 may cause additional problems by leaking through the roof, and into the walls. This may cause wet and/or settled insulation 240 and may cause mold and mildew stains 260. These can present both health and physical safety hazards.

FIG. 3 discloses other exemplary configurations where undesirable accumulation may occur. In FIG. 3A, a structure with a two level elevation may experience snow accumulation in the joint between the two levels. Thus roof 102 of the lower-level may experience excessive loading from drift 310. In another exemplary embodiment, a structure with a pitched roof 102 is subject to wind forces 322. Wind 322 may cause snow to accumulate on the leeward side of the roof 102. FIGS. 3C and 3D disclose a structure with a parapet wall. The parapet wall may cause accumulation varying from a small drift 330 to a large drift 340. Small drift 330 may cause ordinary loading, causing DAM 120 to enter an alert state, while large drift 340 may cause excessive loading, causing DAM 120 to enter an alarm state.

Figure 4:
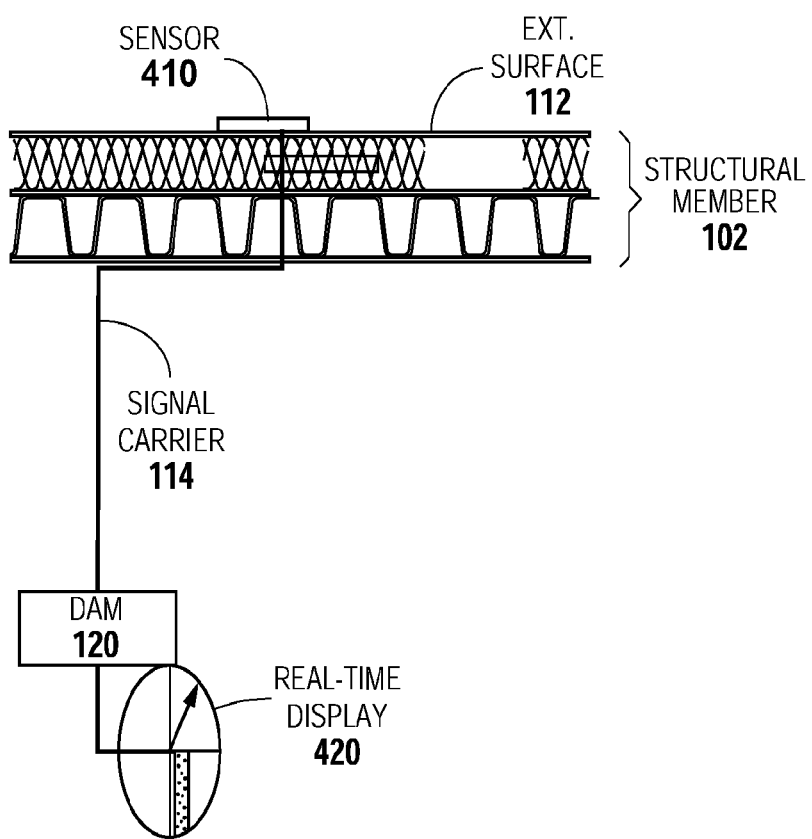
FIG. 4 discloses an exemplary placement of a force transducer.

FIG. 4 shows an exemplary placement of a force transducer 410. Force transducer for 10 is part of sensor array 110. Force transducer 410 is placed so as to be mounted on exterior surface 112 of structural member 102. Force transducer for 10 is communicatively coupled to DAM 120 via signal carrier 114.

In an alternative embodiment, sensors may be disposed along an interior surface. For example, force transducers may be embedded within insulation. In that case, the magnitude of the forces may be somewhat attenuated by translation through structural elements. If the force transducers are placed such that external forces are attenuated, the threshold values for the transducers may need to be appropriately adjusted by an engineer.

Figure 5:
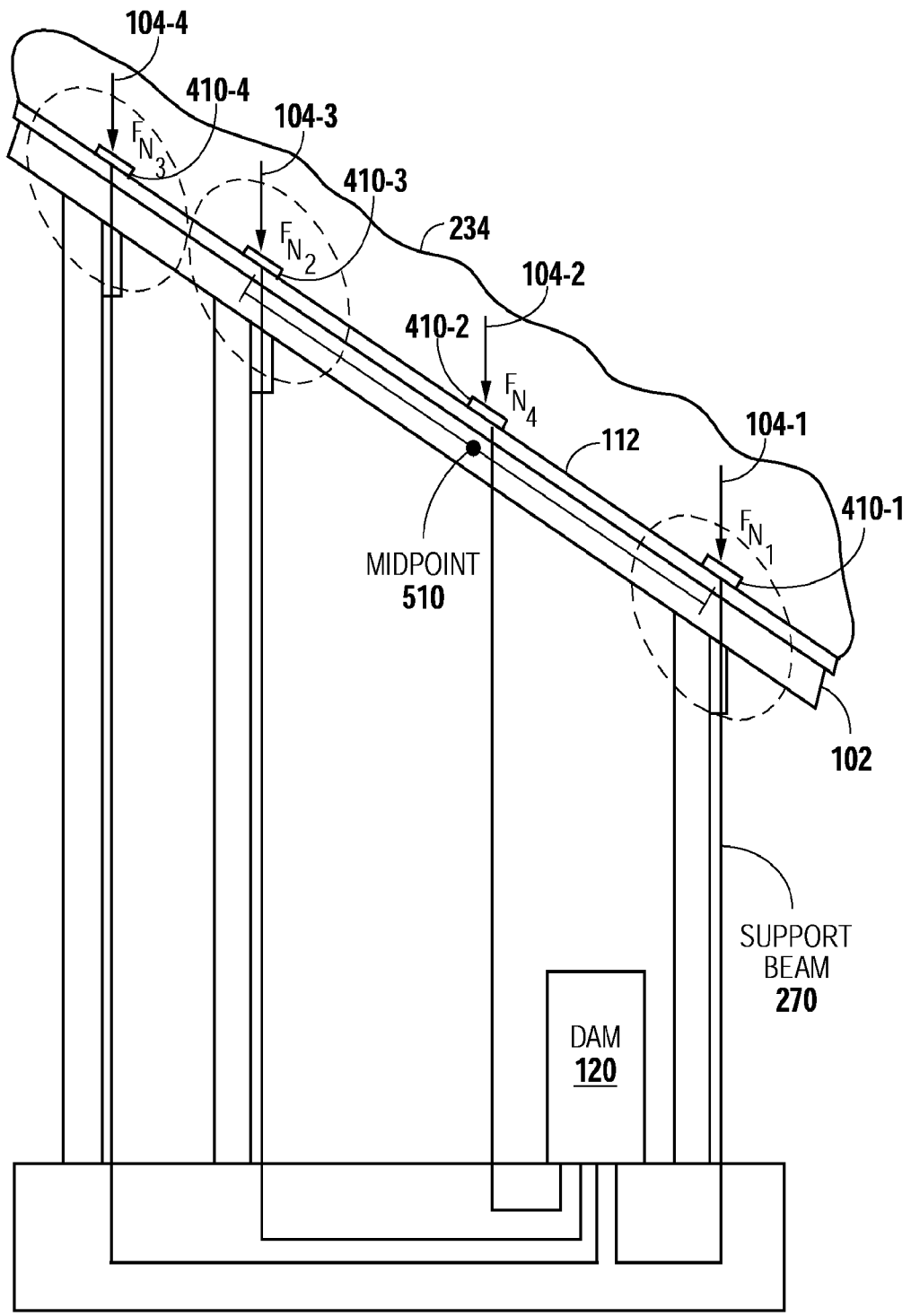
FIG. 5 discloses exemplary placements of a plurality of force transducers in a sensor array.

FIG. 5 more particularly discloses an exemplary embodiment of a transducer array 110. In particular, it is seen in this embodiment that while sensor array 110 may be laid out in a grid pattern, the grid need not be a regular square grid with each of the force transducers 410 equally spaced from one another. Rather, the placement of force transducers may be selected to correspond to desirable measuring points. For example, support beams 270 are shown directly supporting certain portions of structural member 102. Force transducers 410-1, 410-3, and 410-4 may be placed so as to be substantially over support beams 270. Force transducer 410-2 may be placed at a midpoint 510 between transducers 410-1 and 410-3. Midpoint 510 may represent the structurally weakest point on the line segment between 410-1 in 410-3.

Similar first threshold values may be selected for each of the force transducers because the first threshold value represents only normal loading conditions.

The second threshold values for force transducers 410-1, 410-3, and 410-4 may be selected to be relatively high, as these points are less likely to fail under loads. The second threshold value for force transducer 410-2 may be relatively low in comparison to the values for the other force transducers, because it will require relatively less loading to cause a structural failure at midpoint 510.

Force transducer placement may also be selected to indicate problems other than excessive loading that may lead to structural failure. For example, if an ice dam 230 forms over a drain, then water will not be able to properly drain off. A force transducer 410 placed at or near the drain may be configured to detect a force input consistent with ice accumulation, and provide an alert state in the case of ice accumulation so that a user can take corrective action. Similarly, more advanced algorithms may be used to compare the force magnitudes of the various force transducers to create an overall loading profile. A loading profile may be used, for example, to determine that ice damming 230 has caused accumulation of dammed water 232 from the melting of snow 234. This could be determined for example because ice dam 230, dammed water 232, and snow 234 have different densities. By detecting the three discrete regions of different loading, DAM 120 may be able to determine that an ice damming event has occurred and provide a special alert notice to a user via a user interface 170.

In some embodiments, user interface 170 may be programmed to allow a user to perform more sophisticated operations. For example, user interface 170 may allow a user to selectively change threshold values for the force transducers, or to add additional threshold values and create programmable rules for actions to take at those threshold values. User interface 170 may also be provided with modeling software that can display a real-time wire mesh drawing of structural member 102, and may include a color-coded or shaded strain display, such as is commonly used in the art to display loading and strain, so that an end user can monitor stresses on the structure in real-time.

In addition to the human safety advantages described above, commercial advantages may also be derived from use of the present system. For example, insurance companies may charge large fees for insuring commercial structures. With a surface mounted monitoring system of the present disclosure, the danger of catastrophic collapse or failure is greatly reduced, which may reduce insurance rates. And because data analysis module 120 can provide real-time loading information to user interface 160 in real-time or near real-time, loading data can be saved at regular intervals to data storage 150 so that load trending over time can be accurately tracked. Trending over time may be useful in predicting an imminent failure, or in performing a postmortem analysis on a failed building. Such analysis may yield clues to whether the structure weakened over time or was severely compromised by a single catastrophic event. Load trending may also be used, for example, to improve actuarial tables and to train future generations of structural engineers.

While the subject of this specification has been described in connection with one or more exemplary embodiments, it is not intended to limit the claims to the particular forms set forth. On the contrary, the appended claims are intended to cover such alternatives, modifications and equivalents as may be included within their spirit and scope.

What is claimed is:

1. A surface mounted monitoring system for monitoring loading on a structural member, the surface mounted monitoring system comprising:
   a sensor array comprising a plurality of force transducers disposed in an irregular grid on an external surface of a roof, the force transducers being small in width compared to the thickness of the roof between an exterior surface and an interior surface and configured to electrically sense a magnitude of an external force and provide a signal representative of the external force magnitude;
   a data analysis module (DAM) comprising a processor, a storage, and a transmitter, the DAM communicatively coupled to the sensor array and configured to:
   poll the sensor array at an interval of less than one second;
   record the force magnitude signal for each transducer in a circular memory buffer in the storage;
   compare the force magnitude of each transducer to a first force magnitude threshold for that sensor, at least one first force magnitude threshold of a first sensor being different than a first force magnitude threshold of a second sensor;
   upon detecting that the force magnitude of any sensor is greater than the force magnitude threshold for that sensor, enter a non-emergency alert state and send an alert signal on the transmitter;
   compare the force magnitude of each transducer to a second force magnitude threshold for that sensor; and
   upon detecting that the force magnitude of any sensor is greater than the force magnitude threshold for that sensor, enter an alarm state and send an alarm signal on the transmitter.

2. The surface mounted monitoring system of claim 1 further comprising:
   a real time warning system communicatively coupled to the DAM and configured to receive the alarm signal and upon receiving the alarm signal to provide a visible and audible evacuation alarm.

3. The surface mounted monitoring system of claim 2 wherein the real-time warning system is further configured to provide evacuation instructions to residents.

4. The surface mounted monitoring system of claim 1 wherein the storage of the DAM is hardened so that it does not break down even if the DAM is subject to floor or impact or fire.

5. The surface mounted monitoring system of claim 1 further comprising a remote monitoring device communicatively to the DAM, the remote monitoring device comprising a user interface and the remote monitoring device configured to receive force magnitudes, the alert signal, and the alarm signal from the DAM.

6. The surface mounted monitoring system of claim 5 wherein the user interface is configured to provide a real-time loading display based on the force magnitudes received from the DAM.

7. The surface mounted monitoring system of claim 6 wherein the real-time loading display includes a wire mesh drawing of the structural member, and a color-coded strain display.

8. The surface mounted monitoring system of claim 5 wherein the user interface provides the ability for a user to customize force magnitude thresholds.

9. The surface mounted monitoring system of claim 5 wherein the user interface provides the ability for a user to define additional force magnitude thresholds and to create programmable actions to take in response to the thresholds.

10. The surface mounted monitoring system of claim 5 wherein the monitoring device is further configured to create a composite force magnitude profile based on the force magnitude inputs.

11. The surface mounted monitoring system of claim 10 wherein the monitoring device is further configured to analyze the force magnitude profile to identify special loading events.

12. The surface mounted monitoring system of claim 11 wherein one special loading event includes detecting three discrete zones with loading representing the presence of an ice dam.

13. The surface mounted monitoring system of claim 11 wherein one special loading event includes detecting ice buildup around a drain area.

14. The surface mounted monitoring system of claim 5, wherein the monitoring device further comprises a data storage and wherein the monitoring device is further configured to:
   upon receiving the alert signal from the DAM, begin polling the DAM and logging force magnitude data to the data storage at a first interval; and
   upon receiving the alarm signal from the DAM, begin polling the DAM and logging the force magnitude data at a second interval, the second interval being less than the first interval, and provide a visible and audible alarm.

15. The surface mounted monitoring system of claim 1 wherein the transducers are load cells.

16. A surface mounted monitoring system comprising:
   a structure having a roof subject to a variable magnitude load, the load caused by an input selected from the group consisting of wind, ice accumulation, snow accumulation, water accumulation and debris accumulation;
   a plurality of force transducers forming a sensor array, the force transducers being small in width compared to the thickness of the roof between an exterior surface and an interior surface and selected from the group consisting of a piezoelectric sensor, strain gauge, piezoresistive sensor, pressure switch, self resetting sensor, and load cell so that a magnitude of an external force is electrically sensed by one or more of the force transducers, the force transducers disposed in an irregular grid pattern on an exterior surface of the roof, the grid pattern selected to play some of the sensors at point supported directly by reinforcing support beams and other sensors at intermediate points not directly supported by reinforcing support beams;
   a data analysis module (DAM) comprising a processor, a hardened storage that does not break down even if the DAM is subject to floor or impact or fire, and a transmitter, the data analysis module being communicatively coupled to the force transducers and configured to:
   receive from each transducer a force magnitudes signal representative of a realtime normal force exerted on the sensor;
   record the force magnitude of each transducer in a circular memory buffer contained in the hardened storage;
   compare the force magnitudes signal from each transducer to a first force magnitudes threshold value for that transducer; if the force magnitude of any transducer exceeds the first threshold value for that transducer, enter an alert state and provide an alert signal on the transmitter;

compare the force magnitudes signal from each transducer to a second force magnitudes threshold value for that transducer; if the force magnitude of any transducer exceeds the second force magnitudes threshold for that transducer, enter an alarm state wherein the DAM provides an alarm signal on the communication interface;

a remote monitoring device communicatively coupled to the DAM via the transmitter, the monitoring device comprising a permanent data storage and a user interface and configured to:

receive continuously updating force magnitude inputs from the DAM;

display a wire mesh drawing of the roof, the drawing being color-coded to indicate the real-time force magnitudes exerted on each point of the roof;

upon receiving an alert state signal from the DAM, provide on the user interface an alert condition indicator and begin recording force magnitude data at a interval of less than one hour;

upon receiving an alarm condition signal from the DAM, provide a visible and audible alarm on the user interface and begin continuously recording force magnitude data;

a real-time warning system communicatively coupled to the DAM via the transmitter, and configured to:

upon receiving an alarm signal from the DAM, operate an evacuation alert system to provide an audible and visible warning of danger to the structure, and provide evacuation instructions to residents of the structure.

* * * * *